Patented May 24, 1932

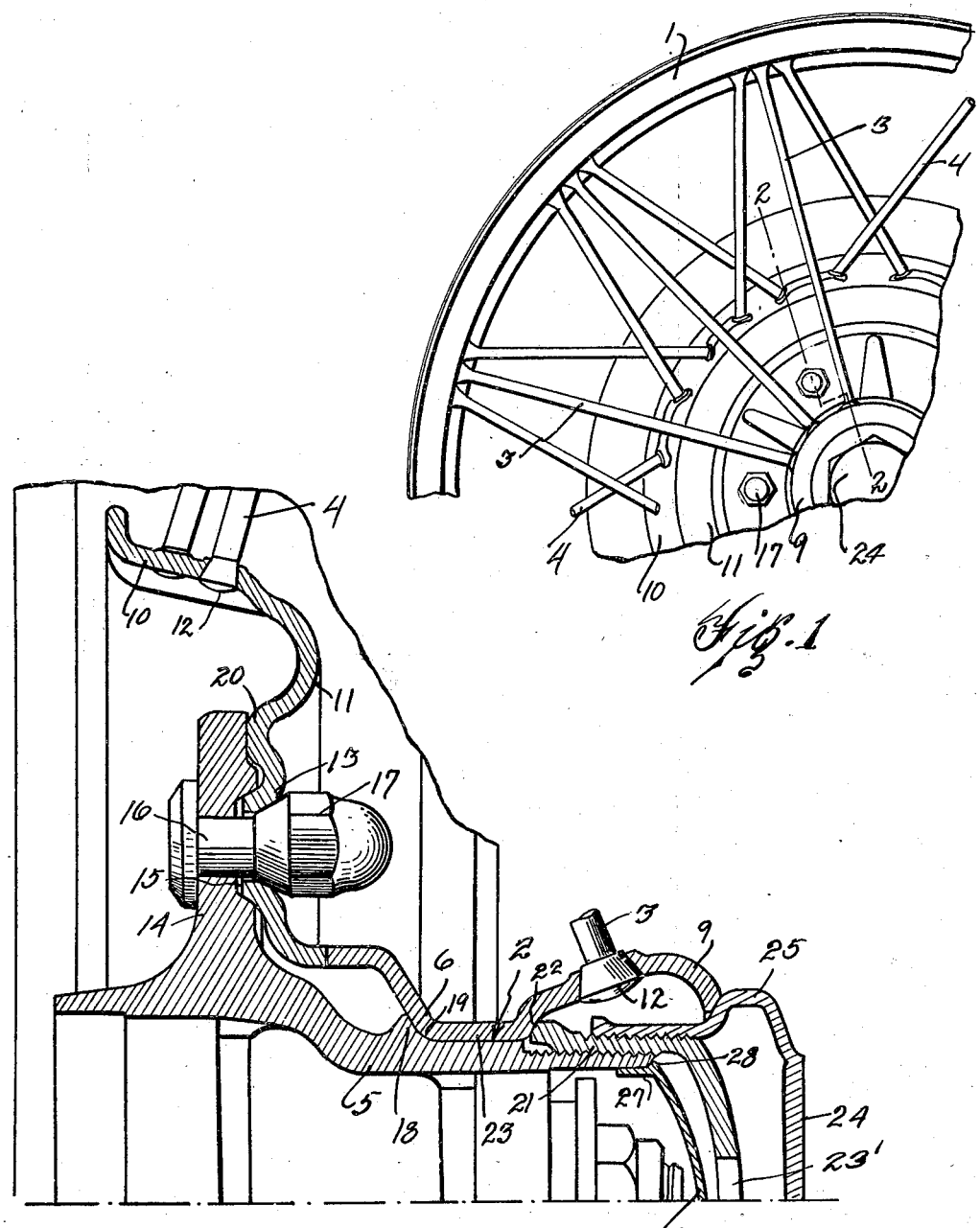

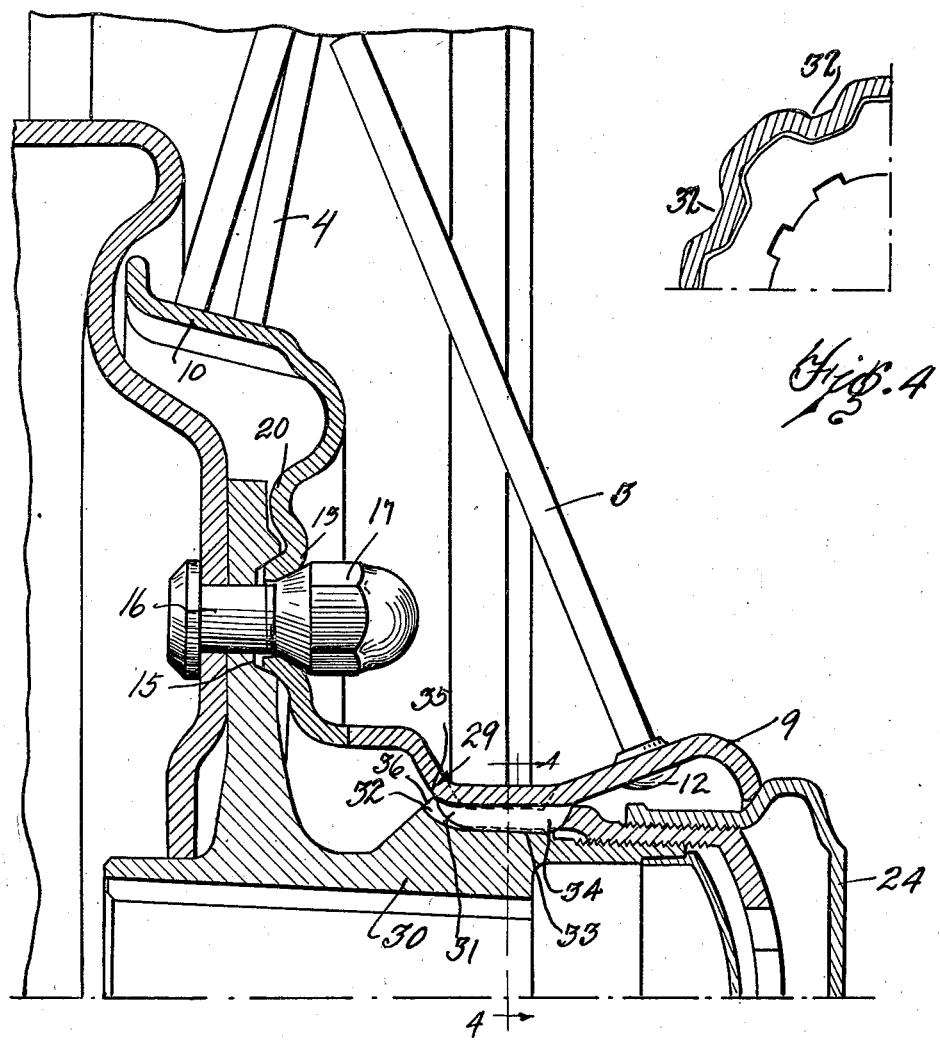

1,860,226

UNITED STATES PATENT OFFICE

WILLIAM N. BOOTH, OF DETROIT, MICHIGAN, ASSIGNOR TO KELSEY-HAYES WHEEL CORPORATION, OF DETROIT, MICHIGAN, A CORPORATION OF NEW YORK

VEHICLE WHEEL

Application filed January 6, 1927. Serial No. 159,364.

The invention relates to vehicle wheels and is designed particularly for use with that type having wire spokes. One of the objects of the invention is the provision of an improved arrangement for detachably connecting and driving the hub member of a wheel body respectively to and from the hub member of the wheel. Another object is the provision of means engageable with the hub member of the wheel and abutting the hub member of the wheel body internally for holding the hub members from disengagement. A further object is the provision of means for holding the hub locking means from disengagement. With these as well as other objects in view the invention resides in the novel features of construction and combinations and arrangements of parts as more fully hereinafter set forth.

In the drawings:—

Figure 1 is a side elevation of a portion of a vehicle wheel embodying my invention;

Figure 2 is a cross section taken substantially on the line 2—2 of Figure 1;

Figure 3 is a view similar to Figure 2 showing a modified wheel;

Figure 4 is a cross section on the line 4—4 of Figure 3.

The vehicle wheel shown in Figures 1 and 2 has the tire carrying rim 1, the hub 2 and the series of front and rear spokes 3 and 4, respectively, which extend between the hub and rim and support the former from the latter. The hub 2 is formed of the inner section 5 and the outer section or shell 6 which latter is preferably formed of sheet metal and is axially engageable over the inner section and is detachably secured thereto. The outer ends of the front and rear spokes are connected to the base of the rim respectively at the rear and front edges thereof, while the inner ends of these spokes are respectively connected to the front and rear ends of the outer section 6 of the hub. The spokes are straight from their points of connection to the rim and the outer section of the hub and have at their outer ends the tenons 7 and enlargements 8 forming shoulders, the tenons passing radially through the base of the rim and being rigidly held thereagainst by riveting over the ends of the tenons against the outer face of the base. The inner ends of the front spokes extend through the rear face of the annular bead 9 at the front end of the outer section 6 of the hub, while the inner ends of the rear spokes extend through the peripheral transverse flange 10 upon the radial flange 11 of the outer section 6. Both the front and rear spokes have at their inner ends the heads 12 which are engageable with the inner faces of the bead and transverse flange, the arrangement being such that the spokes are free to move longitudinally inward relative to the outer section of the hub. However, they are rigidly secured to the rim.

The wheel body comprising the rim 1, the front and rear spokes 3 and 4, respectively, and the outer section 6 of the hub is attachable to or detachable from the inner section 5 of the hub and as shown in Figure 2 particularly the radial flange 11 of the outer section is provided with the frusto-conical flanges 13 and the radial flange 14 of the inner section is provided with corresponding recesses 15 for receiving the frusto-conical flanges. 16 are securing bolts extending through the radial flange 14 and 17 are nuts threaded upon the bolts and having frusto-conical inner ends for engaging the faces of the frusto-conical flanges and forcing the same into engagement with the walls of the frusto-conical recesses. 18 is an annular shoulder upon the inner section 5 while 19 is a cooperating annular shoulder upon the outer section 6, these shoulders being so located that upon securing the wheel body to the inner section they contact prior to engagement of the frusto-conical flanges 13 and the radially outward annular reinforcing rib 20 upon the radial flange of the outer section with the radial flange of the inner section. As a consequence, tightening up of the nuts 17 flexes the radial flange of the outer section to increase the tension of the spokes and finally forces the frusto-conical flanges into contact with the walls of the recesses to effect a driving engagement of the wheel body from the inner section of the hub without subjecting the bolts to a shearing stress.

For insuring the securing of the wheel body to the inner section of the hub, I have provided the clamping nut 21 which has a cylindrical flange internally threaded to engage external threads upon the front end of the inner section. The end of this cylindrical flange abuts the internal shoulder 22 formed by the annular depressed portion 23 of the outer section 6 of the hub and holds the outer section with its shoulder 19 against the shoulder 18. The clamping nut is cup-shaped and its end is provided with the polygonal opening 23' for engagement by a suitable tool to apply or remove the clamping nut. For locking the clamping nut in place there is the hub cap 24 which is internally threaded to engage external threads upon the cylindrical flange of the clamping nut and which has the enlarged portion 25 axially beyond the front end of the outer section 6 and adapted to abut the same. With this arrangement, the clamping nut and hub cap are in firm engagement with the outer section of the hub so that the clamping nut is held from accidental disengagement.

To retain the lubricant within the inner section of the hub I have provided the retainer 26 which is preferably formed of sheet metal and is cup-shaped. This retainer has the resilient cylindrical flange 27 for slidably engaging the inner face of the inner section and the annular bead 28 for abutting the front end of the inner section. This bead permits of inserting a tool such as a screw driver between it and the front end of the inner section to remove the retainer.

In the modification shown in Figures 3 and 4, a rear wheel is disclosed having the same general arrangement of parts as shown in Figures 1 and 2. This rear wheel, however, is provided with an additional means for driving the outer section 29 of the hub from the inner section 30. In detail, the annular depression 31 in the barrel of the outer section and the adjacent portion 32 of the barrel of the inner section are axially fluted to provide cooperating grooves 33 and projections 34. These grooves and projections have a sliding fit to permit readily applying or removing the wheel body including the outer section of the hub to or from the inner section of the hub and furthermore allow the shoulders 35 and 36 respectively upon the outer and inner sections to contact and thereby limit the axially inward movement of the outer section relative to the inner section so that flexing of the radial flange of the outer section upon tightening the clamping nuts is assured.

From the above description, it will be readily seen that I have provided a safety means for retaining the wheel body upon the inner section of the hub; that this safety means may be locked from accidental disengagement and that it with the means for driving the outer section of the hub with the inner section provides a substantial hub construction which is so arranged that the outer section may be readily applied to or removed from the inner section.

What I claim as my invention is:

1. In a vehicle wheel, the combination with an inner hub member, an outer hub member, means threaded upon the inner hub member and projecting within the outer hub member and engaging the latter for securing said members together, additional means also projecting into the outer hub and threaded upon the first-named means and engaging the outer hub member for securing the first-named means against movement.

2. In a vehicle wheel, the combination with an inner hub member, an outer hub member surrounding a portion of the inner hub member and having an internal shoulder intermediate the ends thereof, means threaded upon the inner hub member and projecting within the outer hub member and engageable with the shoulder aforesaid for securing said members together, and additional means having a portion projecting within the outer hub member and threaded upon the first named means and having another portion engageable with the outer hub member for securing the said first named means against movement.

3. In a vehicle wheel, the combination with inner and outer hub members having cooperating engaging seat portions, of an abutment projecting inwardly from the outer hub member intermediate the ends thereof, a clamping nut upon the inner hub member and engageable with said abutment for urging the outer hub member axially to effect an engagement of said seat portions, and a hub cap threaded upon said clamping nut and engageable with said outer hub member.

4. In a vehicle wheel, the combination with inner and outer hub members having cooperating engaging seat portions, of an abutment projecting inwardly from the outer hub member, a clamping nut threaded externally upon the inner hub member and engageable with said abutment for urging the outer hub member axially to effect an engagement of said seat portions, and a hub cap threaded externally upon said clamping nut and provided with an enlarged portion axially beyond the outer hub member and abutting the same.

In testimony whereof I affix my signature.

WILLIAM N. BOOTH.